United States Patent

Young et al.

(10) Patent No.: US 6,819,854 B1
(45) Date of Patent: Nov. 16, 2004

(54) FIBER OPTIC ROTARY FLEX

(75) Inventors: Edward L. Young, Willis, VA (US); Anthony L. Bowman, Pembroke, VA (US); John D. Shockley, Blacksburg, VA (US)

(73) Assignee: Moog Components Group Inc., East Aurora, NY (US)

( * ) Notice: Subject to any disclaimer, the term of this patent is extended or adjusted under 35 U.S.C. 154(b) by 0 days.

(21) Appl. No.: 10/250,076

(22) Filed: Jun. 2, 2003

Related U.S. Application Data

(60) Provisional application No. 60/319,781, filed on Dec. 13, 2002.

(51) Int. Cl.[7] ................................................ G02B 6/00
(52) U.S. Cl. ........................ 385/134; 385/137; 385/147
(58) Field of Search ................................. 385/134–137, 385/147, 26, 25

(56) References Cited

U.S. PATENT DOCUMENTS

| | | | |
|---|---|---|---|
| 4,710,131 A | 12/1987 | Bonenberger | 439/13 |
| 4,744,763 A | 5/1988 | Suzuki et al. | 439/15 |
| 5,078,466 A * | 1/1992 | MacCulloch | 385/26 |
| 5,310,356 A | 5/1994 | Obata et al. | 439/169 |
| 5,334,023 A | 8/1994 | Schauer et al. | 439/164 |
| 5,413,492 A | 5/1995 | Obata | 439/164 |
| 5,566,900 A | 10/1996 | Betker et al. | 242/388 |
| 5,586,381 A | 12/1996 | Schauer et al. | 29/434 |
| 5,649,832 A | 7/1997 | Wolf | 439/164 |
| 5,752,843 A | 5/1998 | Kawamoto et al. | 439/164 |
| 6,358,073 B1 | 3/2002 | Jhanson et al. | 439/164 |

* cited by examiner

*Primary Examiner*—Frank G. Font
*Assistant Examiner*—Michael P. Mooney
(74) *Attorney, Agent, or Firm*—Phillips Lytle LLP

(57) ABSTRACT

A rotary hub unit (U) for a transmission cable (C) includes a stationary hub (10) having a longitudinal axis (12). An angular transition cable portion (14) transmits a signal (16) between a first junction (18) and a second end junction (20). The first junction end (18) is perpendicular to the second junction end (20). A housing (22) is rotatably mounted about the longitudinal axis (12) and has an interior (24) adapted to receive a coiled portion (26) of transmission cable. The coil (26) is wrapped about the longitudinal axis (12), has a first end (28) mated with the angular transition second junction end (20), and an outer end (32) such that the rotary hub unit (U) permits limited movement of the outer end (32) of the coil (26).

4 Claims, 2 Drawing Sheets

FIBER OPTIC ROTARY FLEX

CROSS REFERENCE TO RELATED APPLICATIONS

This application claims the benefit of U.S. Provisional Application Ser. No. 60/319,781, filed Dec. 13, 2002, entitled FIBER OPTIC ROTARY FLEX.

BACKGROUND OF INVENTION

1. Technical Field

The invention relates to the field of rotary joints for the transmission of a signal, and more particularly, or conducting an optical signal between two points.

2. Background Art

The fiber optic rotary flex is a limited rotation device that will allow for the inclusion of single-mode and multi-mode fiber optic channels in standard polytwists. Optical fibers pass through the shaft protected by a small diameter rigid tube. The tube not only protects the fiber from accidental breakage, it controls the bend radius, thus limiting power loss. As the tube exits into the flange, the fiber passes from the rigid tubing into flexible tubing. The fiber is then wound around the rotating axis, in a perpendicular plane to that axis, with enough wraps to provide the necessary amount of travel. As the industry begins to rely more and more on high speed data links, the use of optical fiber in a rotary component system should increase.

It is believed that the present invention offers many advantages to known limited rotation products (polytwists):

The present device is very small and can easily be retrofitted into current designs. This allows the advantage of high speed data transmission while maintaining currently designed and qualified parts.

When bend radii are properly formed, losses are very low; less than 1 dB.

Manufacturing costs are extremely low. When used as a retrofit in a current design, tooling should be unaffected.

The present invention can be used with single mode or multi mode fiber.

The optical cable is subject to a low torque.

The known solution to transmitting optical signals across a rotating interface involves either a fiber optic rotary joint or a cable wrap. U.S. Pat. No. 4,710,131, issued Dec. 1, 1987, is an example of such known fiber optic rotary joint. The known rotary joint will allow unlimited rotation in either direction; however, it is much more costly and much larger in size. It is also very difficult to incorporate into existing designs. The cable wrap is a generally unreliable answer to rotary component needs. They are bulky, hard to install, and torque response uniformity is hard to maintain from part to part.

While the above cited references introduce and disclose a number of noteworthy advances and technological improvements within the art, none completely fulfills the specific objectives achieved by this invention.

SUMMARY OF INVENTION

In accordance with the present invention, a rotary hub unit for a transmission cable includes a stationary hub having a longitudinal axis therethrough. An angular transition portion of a desired transmission cable transmits a signal between a first junction end mounted with the stationary hub to a second end junction mounted with the stationary junction hub. The first junction end of the angular transition portion should be essentially perpendicular to the second junction end.

A housing unit is rotatably mounted about the longitudinal axis of the stationary hub, and has an interior that is adapted to receive a portion of transmission cable. A coiled portion of transmission cable is formed about the longitudinal axis of the stationary hub in the housing interior. The coiled portion of the transmission cable has a first end that is mated with the second junction end of the angular transition portion, and also an outer end for transmitting the signal out of the housing.

The rotary hub unit permits limited movement of the outer end of the transmission cable coil relative to the longitudinal axis of the stationary hub.

These and other objects, advantages and features of this invention will be apparent from the following description taken with reference to the accompanying drawings, wherein is shown the preferred embodiments of the invention

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
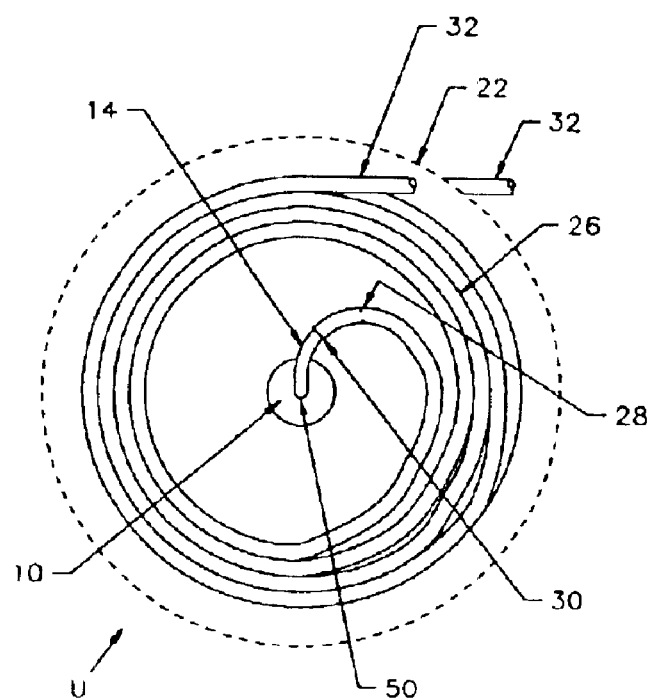
FIG. 1 is a top view of the present rotary hub unit with the housing shown in phantom.
Figure 2:
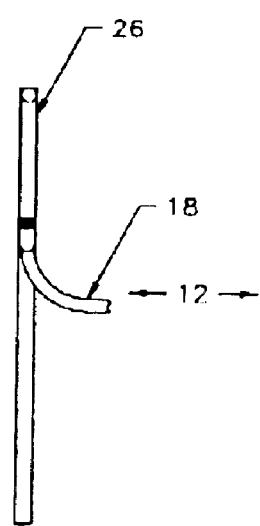
FIG. 2 is a side view of the coiled portion of the transmission cable.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A rotary hub unit U for a transmission cable C includes a stationary hub 10 having a longitudinal axis 12. An angular transition portion 14 of a desired transmission cable C transmits a signal 16 between a first junction end 18 mounted with the stationary hub 10 to a second end junction 20 mounted without the stationary junction hub 10. The first junction end 18 of the angular transition portion 14 should be essentially perpendicular to the second junction end 20, but the angle between the two junction ends may be as selected for the specific use.

A housing unit 22 is rotatably mounted about the longitudinal axis 12 of the stationary hub 10, and has an interior 24 that is adapted to receive a portion of transmission cable C. A coiled portion 26 of compatible transmission cable C is formed about the longitudinal axis 12 of the stationary hub 10 in the housing interior 24 in such a manner that the coil 26 may compress and relax.

The coiled portion 26 of the transmission cable C has a first end 28 that is mated at 30 with the second junction end 20 of the angular transition portion 14. Also an outer end 32 for transmitting the signal 16 extends out of the housing 22 for further mating with another portion of the transmission cable C.

The rotary hub unit U permits limited movement of the outer end 32 of the transmission cable coil 26 relative to the longitudinal axis 12 of the rotary hub 10.

The transmission cable C generally is a cable adapted to transmit an optical signal, such as a fiber optic cable or guide.

For ease of mounting and other reasons, the first junction end 18 of the angular transition portion 14 is preferably located along the central longitudinal axis 12 of the stationary hub 10 about which central axis the outer end rotates. See FIG. 3.

The housing 22 generally includes a lower side or surface 34 with a central opening 36 through which a cylindrical core segment 38 of the stationary hub 10 passes. The lower surface 34 may be retained by a retaining lip 40 formed on an inner end of the core 38.

On the opposite side of the coil 26 is the upper side or surface 42 of the housing 22. Edge 44 joins the upper 42 and lower 34 sides of the housing 22.

The housing 22 and the stationary hub 10 may be formed from a plastic, resin, or machined from a metal as desired for the specific design.

Preferably, the angular transition portion 14 is a comparatively rigid cable segment to resist twisting. It may be imbedded within the core 38. The first be adapted to mate with an end 46 the transmission cable C at junction or mating 48. A curve or elbow 50 joins the first junction end 18 to the second junction end 20.

Figure 3:
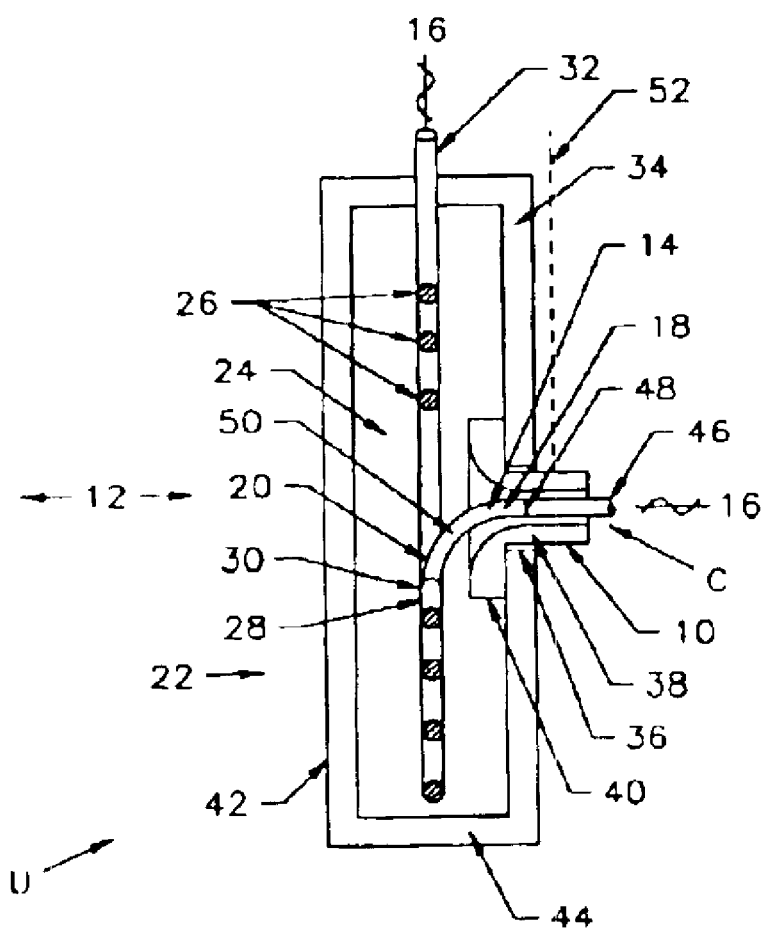
FIG. 3 is a cross-sectional view of the present rotary hub.

FIG. 3 shows a surface 52 in phantom that depicts a bulkhead or other body through which the transmission cable C may pass.

The foregoing disclosure and description of the invention are illustrative and explanatory thereof, and various changes in the size, shape and materials, as well as in the details of the illustrated construction may be made without departing from the spirit of the invention.

What is claimed is:

1. A hub unit for a transmission cable comprising: a stationary hub having a longitudinal axis therethrough; an angular transition portion of a desired transmission cable for transmitting a signal between a first junction end mounted with the stationary hub to a second junction end mounted with the stationary junction hub; the first junction end of the angular transition portion being essentially perpendicular to the second junction end; a housing unit rotatably mounted about the longitudinal axis of the stationary hub and having an interior adapted to receive a portion of transmission cable; and a coiled portion of transmission cable formed about the longitudinal axis of the stationary hub in the housing interior; the coiled portion of transmission cable having a first end mated with the second junction end of the angular transition portion and an outer end for transmitting the signal out of the housing; whereby the hub unit permits limited movement of the outer end of the transmission cable coil about the longitudinal axis of the stationary hub.

2. The invention of claim 1 wherein the transmission cable comprises a cable adapted to transmit an optical signal.

3. The invention of claim 1 wherein the transmission cable is a fiber optic cable.

4. The invention of claim 1 wherein the first junction end of the angular transition portion is located along the central longitudinal axis of the stationary hub.

* * * * *